US 6,707,506 B1

(12) United States Patent
Grzibek

(10) Patent No.: US 6,707,506 B1
(45) Date of Patent: Mar. 16, 2004

(54) VIDEO MIXER

(75) Inventor: Rolf Grzibek, Frankfurt (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/311,127

(22) Filed: May 13, 1999

(30) Foreign Application Priority Data

May 16, 1998 (DE) .......................................... 198 22 101

(51) Int. Cl.⁷ ................................................ H04N 9/74
(52) U.S. Cl. ...................................... 348/584; 348/598
(58) Field of Search ................................ 348/584, 576, 348/595, 597, 600, 553, 552, 586, 587, 592, 598, 599, 705, 706; 386/52, 53, 54; 345/629, 634, 632, 633, 635, 636, 641; H04N 9/74, 9/76

(56) References Cited

U.S. PATENT DOCUMENTS

| | | | | |
|---|---|---|---|---|
| 3,944,731 A | * | 3/1976 | Busch ........................ 348/588 |
| 4,605,968 A | * | 8/1986 | Hayashi ...................... 348/553 |
| 5,012,342 A | * | 4/1991 | Olsen et al. ................. 348/591 |
| 5,075,766 A | * | 12/1991 | Sendelweck ................. 348/569 |
| 5,327,160 A | * | 7/1994 | Asher ......................... 348/553 |
| 5,469,221 A | * | 11/1995 | Takeuchi ..................... 348/564 |
| 5,471,539 A | * | 11/1995 | Flum et al. .................. 381/119 |
| 5,600,370 A | * | 2/1997 | Furuyama .................... 348/239 |
| 5,608,465 A | * | 3/1997 | Lake ........................... 348/584 |
| 5,619,339 A | * | 4/1997 | Iguchi et al. ................. 360/69 |
| 5,646,699 A | * | 7/1997 | Oh et al. ..................... 348/553 |
| 5,758,206 A | * | 5/1998 | Imaoka ........................ 348/347 |
| 5,827,990 A | * | 10/1998 | Fujita ....................... 434/307 A |
| 5,907,367 A | * | 5/1999 | Edwards et al. ............ 348/501 |
| 6,020,931 A | * | 2/2000 | Bilbrey et al. .............. 348/584 |

* cited by examiner

*Primary Examiner*—Sherrie Hsia
(74) *Attorney, Agent, or Firm*—Joseph S. Tripoli; Harvey D. Fried; Francis A. Davenport

(57) ABSTRACT

In a video mixer (1) in which a video component of the video signal to be mixed and a mixing type are preselectable for performing a mixing operation on said video signal applied to the mixer (1), an additional external function on the video mixer can be controlled in that an additional external function is selectable at the video mixer (1), this function being selectable from predetermined additional external functions, and in that the video mixer (1) generates a control signal during a mixing operation for controlling a selected external function, this control signal changing from a first extreme value to a second extreme value in the course of the mixing operation and serving for controlling the selected external function, an initial value of a variable of the external function being assigned to the first extreme value of the control signal and a final value of the variable of the external function being assigned to the second extreme value of the control signal.

20 Claims, 1 Drawing Sheet

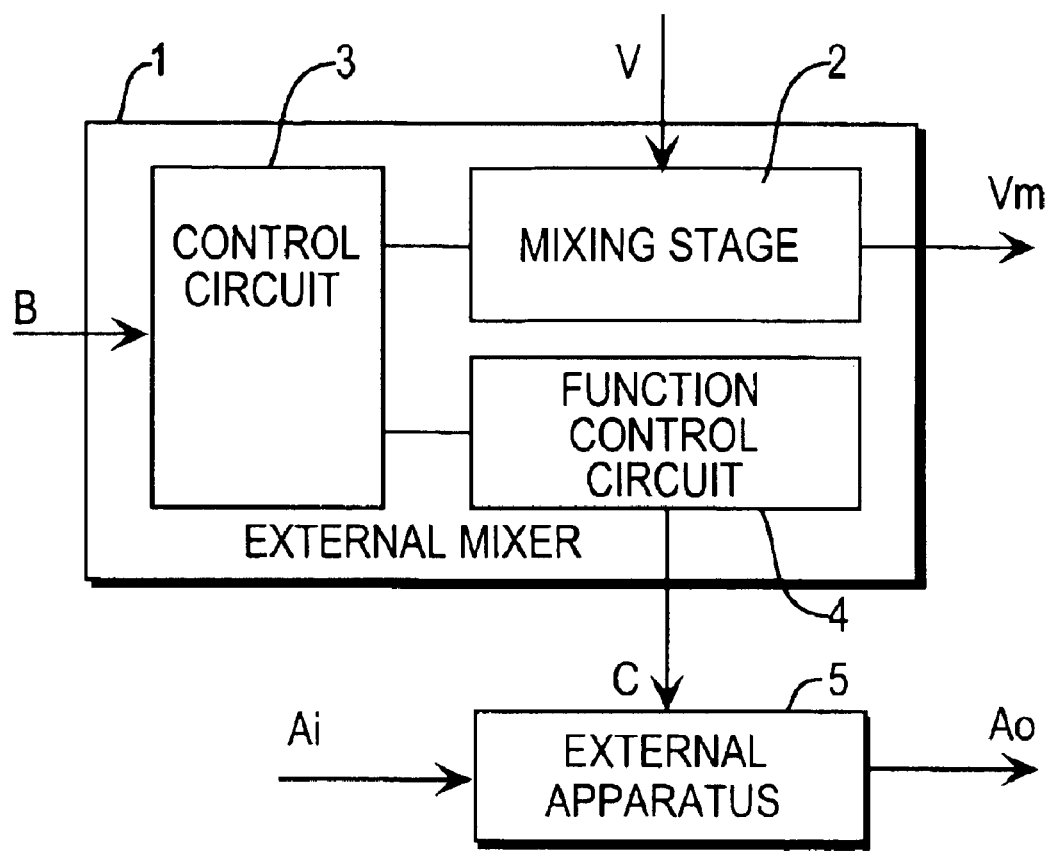

VIDEO MIXER

BACKGROUND OF THE INVENTION

1. Field of the Invention

The invention relates to a video mixer in which a video component of the video signal to be mixed and a mixing type are preselectable for performing a mixing operation on said video signal applied to the mixer.

2. Description of the Related Art

Such video mixers provide the possibility of selecting at least one component of the video signal for performing a mixing operation, this component being subsequently subjected to the mixing operation. For example, the foreground signal, background signal or chromakey of the video signal may be selected. After the video signal has been supplied, a mixing operation, whose type is also preselectable, is then performed on the selected signal(s) of this video signal.

SUMMARY OF THE INVENTION

It is an object of the invention to improve a mixer of this type to such an extent that an additional function by means of the mixer is controllable, which function can be performed temporally parallel to the actual mixing operation performed by the mixer.

According to the invention, this object is achieved in that an additional external function is selectable at the video mixer, this additional function being selectable from predetermined additional external functions, and in that the video mixer generates a control signal during a mixing operation for controlling a selected external function, this control signal changing from a first extreme value to a second extreme value in the course of the mixing operation and serving for controlling the selected external function, an initial value of a variation of the external function being assigned to the first extreme value of the control signal and a final value of the variation of the external function being assigned to the second extreme value of the control signal.

At least one function is selectable from a list of predetermined additional external functions. This additional external function can be selected before performing a mixing operation so that it is subsequently also performed during the mixing operation.

This control is realized by means of a control signal generated by the mixer for triggering and controlling the selected additional external function. Depending on the type of the selected additional external function, the control signal is generated in an appropriate or adapted manner.

During the mixing operation, the control signal runs through signal values between a first extreme value and a second extreme value. An initial value of the variable external function is assigned to the first extreme value and a final value of this variable is assigned to the second extreme value. This provides the possibility of performing a continuous variation of the external function between the initial value and the final value in dependence upon the control signal value which changes between the two extreme values. In this way, continuous external functions can be controlled.

Moreover, it is achieved that the external function is performed in time synchronism with the mixing operation and that the variation of the external function ranges between a desired initial value and a final value. Triggering and control of the external function does not require any further operating steps, except the previous selection.

In a feature of the invention, the external function is generally selected and performed in addition to a mixing function. However, it is alternatively possible, to perform only the external function, i.e) without having preselected a video signal component, on which a mixing operation was performed.

In a further embodiment of the invention, the external function is advantageously varied proportionally to the changing value of the control signal so that also the range of variation of the external function can be influenced by the control signal. This may be used, for example, for a picture fading operation to be performed as an additional external function by the mixer, together with a synchronous sound-fading operation. Also, for example, a given audio clip could be played time-synchronously during the mixing operation.

In accordance with a further embodiment of the invention, the control signal advantageously controls an external apparatus which performs the additional external function in dependence upon the control signal.

In any case, the invention ensures that the desired external function is performed at the desired instant and is synchronized with the mixing operation and the desired course of the operation.

These and other aspects of the invention will be apparent from and elucidated with reference to the embodiments described hereinafter.

BRIEF DESCRIPTION OF THE DRAWINGS

In the drawing:

The sole FIGURE shows, diagrammatically, a mixer according to the invention by means of which an external apparatus is controllable.

DESCRIPTION OF THE PREFERRED EMBODIMENTS

The external mixer 1 can be controlled by an operator B. The operator may select a component (not further indicated in the Figure) of a video signal V for a mixing operation to be performed. For example, the foreground signal, background signal or chromakey of the video signal may be selected.

Furthermore, the mode of the mixing operation to be performed on this component can be preselected. For example, soft fading or different types of other fading operations are selectable.

According to the invention, a further external function can be selected from a list of predetermined external functions. When this additional external function has been selected for a mixing operation, this function is additionally controlled synchronously with this mixing operation.

The above-described selection of the video component and the mode of the mixing operation causes the control circuit 3 of the mixer shown in the Figure to supply a corresponding signal to a mixing stage 2 which receives the components of the video signal V and, upon triggering a mixing operation, subjects the selected component of the video signal V to the mixing operation of a selected mode and supplies it as a mixed video signal (or mixed component of the video signal) $V_m$.

It is often desirable to trigger an additional function parallel to and in time-synchronism with this mixing operation. For example, the additional function may be audio fading, playing an audio clip, triggering another mixing operation, controlling a video camera or the like. For performing such an additional function, the operator B can select the desired function from a list of predetermined functions. If this function has been selected for a mixing operation to be performed subsequently, the control circuit 3 of the mixer 1 supplies a corresponding signal to a function control circuit 4 also arranged in the mixer 1, which function control circuit generates a control signal C which is applied to the external apparatus 5. During the mixing operation, the external apparatus 5 then performs the additional external function under the control of the control signal C.

Dependent on the mode of the external function, the external apparatus may be, for example, a digital video editor, a slow motion recorder, a text generator, an audio device, the optical system of a video camera or other apparatuses. In the case of an optical system of a video camera, the external function may be employed for focal length control of the optical system.

By means of the values assumed by the control signal C, such an additional function can not only be triggered but can also be controlled or influenced during its operation. For this purpose, the value of the control signal C changes between a first and a second extreme value. An initial value and a final value of the external function are assigned to these two extreme values. When the control signal C changes between the first and the second extreme value, the external function controlled by this control signal C is continuously changed between the initial value and the final value. Due to the variation of the value of the control signal, the function is thereby not only controllable, but its magnitude and variation can also be influenced.

If, for example, an audio device is the external apparatus and if an audio clip is played back as an additional external function, the audio clip can be played back time-synchronously and with the desired initial and final values when a mixing operation by means of the mixer stage 2 of the video mixer 1 is being performed. The variation of the values of the control signal ensures that the desired phase of the audio clip is played back at any instant during the mixing operation.

This also applies to other external functions which are selectable and controllable by means of the control signal. The mixer according to the invention thus provides the possibility of performing an additional external function of a selectable mode in synchronism with a video mixing operation, with the initial and final values of the external function being predeterminable by corresponding values of the control signal.

What is claimed is:

1. A video mixer in which a video component of the video signal to be mixed and a mixing type are preselectable for performing a mixing operation on said video signal applied to the mixer, the mixer comprising:

means for selecting an additional external function at the video mixer, said additional external function being selectable from predetermined additional external functions; and means for generating a control signal during a mixing operation for controlling the selected additional external function, said control signal changing from a first extreme value to a second extreme value during the mixing operation, and controlling the selected external function, an initial value of a variable of the external function being assigned to the first extreme value of the control signal and a final value of the variable of the external function being assigned to the second extreme value of the control signal.

2. A video mixer as claimed in claim 1, wherein, during a mixing operation on a selected video component, the selected additional external function is also controlled by the control signal.

3. A video mixer as claimed in claim 1, wherein the selected additional external function is controlled by the control signal when a mixing operation is started without a video component having been selected.

4. A video mixer as claimed in claim 1, wherein the variation of the variable of the selected additional external function is effected proportionally to the changing value of the control signal.

5. A video mixer as claimed in claim 1, wherein the selected additional external function comprises an external apparatus controllable by the control signal.

6. A video mixer as claimed in claim 1, wherein the additional external function includes the control of an arrangement for digitally editing a video signal.

7. A video mixer as claimed in claim 1, wherein the additional external function includes a speed control or positioning of a slow motion recorder.

8. A video mixer as claimed in claim 1, wherein the additional external function includes the control of a text generator.

9. A video mixer as claimed in claim 1, wherein the additional external function includes the control of audio effects.

10. A video mixer as claimed in claim 1, wherein the additional external function includes a focal length control of an optical system in a camera.

11. A video mixer, comprising:

a mixer for performing a mixing operation on a video signal applied to the mixer;

means for selecting a video component of a video signal to be mixed and a mixing type and an additional external function, the video component, the mixing type, and the additional external function being user-selectable, at least the additional external function being selectable from predetermined additional external functions, the video component corresponding to only a portion of the video signal representing less than all of a complete image or images corresponding thereto that are displayed to a user; and means for generating a control signal during a mixing operation for controlling the selected additional external function, said control signal changing from a first extreme value to a second extreme value during the mixing operation, and controlling the selected external function, an initial value of a variable of the external function being assigned to the first extreme value of the control signal and a final value of the variable of the external function being assigned to the second extreme value of the control signal.

12. A video mixer as claimed in claim 11, wherein, during a mixing operation on a selected video component, the selected additional external function is also controlled by the control signal.

13. A video mixer as claimed in claim 11, wherein the selected additional external function is controlled by the control signal when a mixing operation is started without a video component having been selected.

14. A video mixer as claimed in claim 11, wherein the variation of the variable of the selected additional external function is effected proportionally to the changing value of the control signal.

15. A video mixer as claimed in claim 11, wherein the selected additional external function comprises an external apparatus controllable by the control signal.

16. A video mixer as claimed in claim 11, wherein the additional external function includes the control of an arrangement for digitally editing a video signal.

17. A video mixer as claimed in claim 11, wherein the additional external function includes a speed control or positioning of a slow motion recorder.

18. A video mixer as claimed in claim 11, wherein the additional external function includes the control of a text generator.

19. A video mixer as claimed in claim 11, wherein the additional external function includes the control of audio effects.

20. A video mixer as claimed in claim 11, wherein the additional external function includes a focal length control of an optical system in a camera.

* * * * *